Oct. 15, 1963     J. L. ERNST ETAL     3,106,950
ADHESION OF DISSIMILAR RUBBERS
Filed March 30, 1956
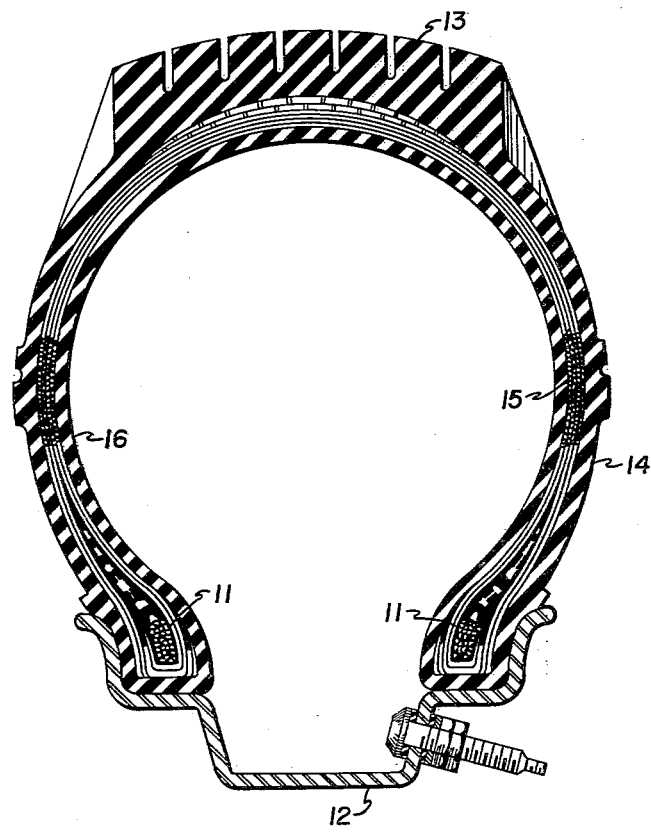
John L. Ernst
Wilbur F. Fischer     Inventors
By     Attorney United States Patent Office  3,106,950
Patented Oct. 15, 1963

3,106,950
ADHESION OF DISSIMILAR RUBBERS
John L. Ernst, Westfield, and Wilbur F. Fischer, Cranford, N.J., assignors to Esso Research and Engineering Company, a corporation of Delaware
Filed Mar. 30, 1956, Ser. No. 575,204
11 Claims. (Cl. 152—330)

This invention relates to novel bonding methods for forming strong adherent bonds between dissimilar rubbery polymer compounds; to brominated butyl rubber containing cement compositions especially adapted for use as bonding means for said dissimilar polymer compounds; and to the resulting structures composed of a plurality of different types of rubbery polymers.

In a variety of operations to produce rubbery and/or elastic type structures, it is frequently desirable to make one portion of the article from one kind of rubbery material, and the other portion from some other kind of rubbery substance. As an example of the foregoing type of bonding between dissimilar rubbery materials, in the production of pneumatic tires containing more than one polymer type, it is necessary to form an adequate and firm bond between inner linings, treads or sidewalls prepared from relatively low unsaturation isoolefin-multiolefin copolymers such as butyl rubber and the more highly unsaturated rubbery materials such as dienestyrene copolymers, natural rubber, and the other highly unsaturated rubbery polymers and mixtures of such rubbery materials from which the carcass is ordinarily prepared.

However, natural rubber, GR-S rubber, Buna-N rubber, and other highly unsaturated rubbers differ greatly from low unsaturation isoolefin-multiolefin copolymers such as butyl rubber in their chemical and physical properties as well as in their respective reactions to compounding, filling, and vulcanizing agents. It is virtually impossible to combine these dissimilar rubbery materials securely by conventional methods used in laminating rubber-like materials of similar properties.

The present invention overcomes the foregoing difficulty and affords various additional advantages as shown in the following description wherein reference will be made to the accompanying drawing, the single FIGURE of which comprises a vertical section of a laminated pneumatic tubeless tire containing dissimilar rubber laminae which have been bonded according to the instant invention.

According to the present invention, low unsaturation isoolefin-multiolefin rubbery copolymers are bonded to highly unsaturated rubbers by the application of at least two adjacent layers of different cements containing brominated butyl rubber to the combining surfaces. A brominated butyl rubber cement, without additional rubbery polymers is applied to the uncured low saturation isoolefin-multiolefin copolymers surface. An admixture of brominated butyl rubber with at least one other more highly unsaturated rubber such as GR-S rubber, natural rubber, mixtures thereof, etc. is applied to the highly unsaturated, uncured copolymer surface also as a cement. The respective unvulcanized rubbery polymer surfaces so treated are then placed together face to face, compressed and cured at temperatures between about 250° and 450° F. to produce the desired high-strength union, junction or weld therebetween.

In practicing the present invention, each of the respective brominated butyl rubber-containing cements is preferably prepared by mixing per 100 parts by weight of total brominated and other polymer or polymers, about 0 to 100, preferably 20 to 60 parts by weight of a filler such as clays, silica, silica-alumina, in particular carbon blacks, and blending the mixture formed with a suitable volatile rubber solvent to a concentration of about 2 to 50, preferably 5 to 20 weight percent based on total rubber hydrocarbon. Suitable rubber solvents include paraffins such as hexane, heptane, isooctane, naphthenes such as cyclohexane, aromatics such as benzene, toluene, or naphthalene, various petroleum hydrocarbon fractions such as naphthas, gasolines, kerosenes, straight run mineral spirits, halogenated hydrocarbons such as ethyl chloride, chloroform, carbon tetrachloride, and other volatile solvents such as phenol, carbon disulfide, etc. The cements are then coated on the respective uncured polymers by brushing, spraying, etc. and the solvent allowed to substantially completely evaporate at temperatures between about 10° to 100° C., preferably about 25° to 80° C.

As abovementioned, the cement to be applied to the low unsaturation isoolefin-multiolefin rubbery copolymer preferably comprises brominated butyl rubber without other rubbery polymers or copolymers. However, the cement to be applied to the more highly unsaturated rubbers such as natural rubber, GR-S rubber, mixtures thereof, etc. should comprise about 25 to 75 weight percent, advantageously about 40 to 60 weight percent, preferably about 50 weight percent of a highly unsaturated rubber, especially natural rubber, with about 75 to 25 weight percent, advantageously about 60 to 40 weight percent, preferably about 50 weight percent of brominated butyl rubber. More particularly, the cement to be applied to the low unsaturation isoolefin-multiolefin rubbery copolymer preferably comprises a 5 to 25 weight percent solution in a $C_5$ to $C_{10}$ relatively saturated hydrocarbon liquid solvent such as pentane, hexane, isooctane, cyclohexane, benzene, toluene, naphtha, straight run mineral spirits, etc. of an admixture of about 100 parts by weight of brominated butyl rubber, about 10 to 70 parts by weight of a filler such as a hydrated silica and/or carbon black, 0–20 parts by weight of a resin-tackifier such as phenolic-aldehyde resins, without other rubbery polymers or copolymers. However, the cement to be applied to the more highly unsaturated rubber should comprise a 5 to 20 weight percent solution in the foregoing hydrocarbon solvents of about 100 parts by weight of an approximately equal mixture of natural rubber and brominated butyl rubber blended with the foregoing amounts of fillers and resin-tackifiers.

It has also been found advantageous that the respective cements applied contain decreased amounts of curatives and preferably no curatives. Such curatives, if used, may include sulfur, zinc oxide, an accelerator such as a thiuram or carbamic acid derivative, quinoid compounds, amino or amido compounds, etc. In producing the desired bond, the cemented sides of the two dissimilar rubbery polymers are united, compressed at 300 to 2,000 p.s.i.g., e.g., 1,500 p.s.i.g. by any suitable means such as in a rubber press and simultaneously vulcanized at temperatures of about 275° to 400° F., preferably 290° to 350° F. for a few minutes and up to several hours or more, e.g. 10 to 60 minutes.

The above procedure, according to the present invention, may be employed to produce superior laminated materials suitable for use in constructing tires for automobiles, trucks, airplanes, etc. as well as for numerous other uses such as conveyor belts and other products built up of a plurality of laminations of dissimilar rubbers; the invention being especially applicable to such products which have at least one layer which is made of butyl rubber.

Butyl rubber comprises a copolymer containing a major proportion, advantageously about 85–99.9%, preferably 95–99.5%, of a $C_4$—$C_8$ isoolefin such as isobutylene, the remainder being a $C_4$—$C_{10}$ multiolefin, preferably a $C_4$—$C_6$ conjugated diolefin such as butadiene, dimethyl butadiene, piperylene, allo-ocymene, or especially isoprene. The preparation of butyl-type rubbers is described in U.S. Patent 2,356,128 to Thomas et al. and also in other patents as well as in literature.

The brominated butyl rubber component of the cement employed according to the present invention contains at least 0.5, preferably at least 2.0 weight percent combined bromine but not more than about 0.5 "X" to 5 "X" weight percent and preferably not more than about "X" to 1.5 "X" weight percent combined bromine wherein $$x = \frac{79.92L}{(100-L)M_1 + L(M_2+79.92)} \times 100$$

and:

$L$ = mole percent of the multiolefin in the polymer
$M_1$ = molecular weight of the isoolefin
$M_2$ = molecular weight of the multiolefin
79.92 = atomic weight of bromine The above brominated butyl rubber is produced by reacting the unvulcanized butyl rubber with bromine or bromine-containing compounds so that the polymer preferably contains at least 0.5 weight percent of combined bromine but not more than about 3 atoms of bromine combined in the polymer per molecule of multiolefin present therein; i.e. generally not more than about 3 atoms of combined bromine per double bond in the polymer.

Suitable brominating agents which may be employed are molecular bromine, alkali metal bromites (preferably sodium hypobromite), sulfur bromides (particularly oxygenated sulfur bromines), pyridinium bromide perbromide, N-bromo-succinimide, alpha-bromoaceto acetanilide, tri-bromophenol bromide, N-bromoacetamide, beta-bromo-methyl phthalimide, and other common brominating agents. The preferred brominating agents are molecular bromine and/or those bromine compounds which are known to lead to allylic substitution, e.g. N-bromosuccinimide, betabromoethyl phthalimide, N-bromoacetamide, etc. The bromination is advantageously conducted at about −30° C. to +100° C., preferably at about 20° to 80° C. for about one minute to several hours. However, the temperatures and times are regulated to brominate the rubbery copolymer to the extent abovementioned.

The bromination may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, naphthalene, chlorobenzene, chloroform, trichloroethane, carbon tetrachloride, etc., and adding thereto the bromide or other brominating agent, preferably in solution, such as dissolved in an alkyl chloride, carbon tetrachloride, etc. Another variation comprises employing liquid bromine. Still a further method resides in blending with the solid copolymer a solid brominating agent which is known to lead to allylic substitution such as N-bromosuccinimide, supra. In such a case, the blend formed is preferably mill-mixed and heated to a temperature sufficient to brominate the solid copolymer. The use of elevated or depressed pressure is optional since atmospheric pressure is satisfactory. However the pressure may vary, depending upon the foregoing temperatures and reaction times from about 1 to 400 p.s.i.

The invention will be better understood from the following experimental data:

BROMINATED BUTYL RUBBER—"A"

Sixty grams of butyl rubber (GR-I-15) were dissolved in 960 grams of carbon tetrachloride. Two milliliters of liquid bromine were then added and reaction was allowed to ensue for one hour at room temperature. The brominated rubbery polymer formed was then precipitated by the addition of excess isopropyl alcohol. In place of isopropyl alcohol, other known non-solvents for butyl rubber may be employed such as $C_1$—$C_4$ alkanols, ketones such as acetone, etc. The rubber polymer was then redissolved in hexane and reprecipitated with isopropyl alcohol. The brominated rubbery product was then dried at 65° C. under a vacuum of 0.1–2.0 inches of mercury absolute. The brominated product compared to the original polymer as follows:

| Original Polymer | | Brominated Product | |
|---|---|---|---|
| Iodine No. (cg./g.) | 11.6 | Iodine No. (cg./g.) | 4.87 |
| | | 2.83 wt. percent combined bromine. | |

*Example 1*

A cement was prepared by mixing 100 parts by weight of a commercial brominated butyl rubber corresponding to brominated butyl rubber "A" with 40 parts by weight of carbon black (M.P.C. black) and dissolving in n-hexane to a concentration of 10 weight percent based on total rubber hydrocarbon. The foregoing commercially available brominated butyl rubber, which is sold under the name of Hycar-2202, had a Mooney viscosity of 50 at 212° F. and contained 2.83 weight percent combined bromine. A coating of the foregoing cement was then brushed on two samples of an uncured butyl rubber compounded stock measuring 2″ by 6″ by 0.125″ and dried at room temperature for one hour. The composition of the butyl rubber stock was as follows:

| Component | Parts by weight | |
|---|---|---|
| | Employed | Preferred Range |
| Commercial Butyl Rubber (corresponding to a GR-I-17 rubber) | 100 | 50–200 |
| Carbon black (M.P.C.) | 66 | 20–100 |
| Zinc Oxide | 5 | 3–50 |
| Sulfur | 2.0 | 0.5–10.0 |
| Stearic acid | 0.5 | 0–5.0 |
| Tetramethyl thiuram disulfide | 1.0 | 0.5–3.0 |
| Phenyl betanaphthylamine | 1.0 | 0–5.0 |
| Para Dinitroso Benzene | 0.25 | 0–1.0 |
| Benzothiazyl Disulfide | 1.0 | 0–5.0 |

Other cements were prepared, as just described except that they contained 0 to 100 parts by weight of natural rubber, the balance of the rubber hydrocarbon content up to 100 parts by weight being brominated butyl rubber "A." These cements were then each coated on an uncured GR-S–natural rubber carcass stock, the cement concentration applied, coating technique and drying conditions being otherwise the same as above described. The composition of the GR-S–natural rubber carcass stock was as follows:

| Component | Parts by weight | |
|---|---|---|
| | Employed | Preferred Range |
| GR-S (regular) | 70 | 10–100 |
| Natural rubber | 30 | 5–90 |
| Carbon Black (E.P.C.) | 15 | 0–30 |
| Commercial thermal black | 30 | 10–50 |
| Zinc oxide | 5.0 | 2–25 |
| Sulfur | 3.0 | 0.5–10.0 |
| Heptylated Diphenyl Amine | 1.0 | 0–5 |
| Benzothiazyl Disulfide | 1.5 | 0–5.0 |

The cement-coated surfaces of the butyl rubbers on the one hand were then united with the cement coated surfaces of the carcass stocks on the other hand and press-cured for 35 minutes at a temperature of 307° F. under 1,500 p.s.i. pressure in a rubber mold. The results were as follows:

*Table I*

ADHESION OF BUTYL TO GR-S-NATURAL RUBBER CARCASS STOCK AT 77° F.

| Test No. | Cement on Butyl (Brominated Butyl, percent) | Cement on GR-S-Natural Rubber Commercial Carcass | | Pounds Pull per inch |
|---|---|---|---|---|
| | | (Brominated Butyl, percent) | (Natural Rubber, percent) | |
| 1 | 100 | 100 | | 8.5 |
| 2 | 100 | 100 | | 9.0 |
| 3 | 100 | | 100 | 10.0 |
| 4 | 100 | 80 | 20 | 10.0 |
| 5 | 100 | 70 | 30 | 10.0 |
| 6 | 100 | 60 | 40 | 20.00 |
| 7 | 100 | 55 | 45 | 37.5 |
| 8 | 100 | 50 | 50 | 46 |
| 9 | 100 | 50 | 50 | 45 |
| 10 | 100 | 40 | 60 | 14 |
| 11 | 100 | 20 | 80 | 13 |

The above data show that improved adhesions of 20 to 46 pounds pull per inch are obtained according to the invention (Test Nos. 6 to 9) whereas inferior values of 8.5 to 9.0 pounds (Test Nos. 1 and 2) were obtained employing only a brominated butyl rubber cement. Also, when a brominated butyl rubber cement was applied to the butyl stock and a rubber cement containing only natural rubber was applied to the commercial carcass, only 10 pounds pull per inch was obtained; (Test No. 3). Similarly, by employing as the cement to coat the carcass rubber proportions outside of those disclosed by the present invention (e.g. about 40 to 60% brominated butyl with about 60 to 40% natural rubber), adhesion values of only 10 to 14 pounds pull per inch were obtained (e.g., Test Nos. 4, 5, 10 and 11). Therefore, in order to obtain improved adhesion between butyl and more highly unsaturated rubbers such as GR-S and/or natural rubber, the cements must be applied in the manner and in the proportions disclosed herein.

*Example II*

The same general procedure as in Example I was repeated except that the carcass compound was a commercial carcass stock comprising GR-S and natural rubber; the butyl rubber stock being as follows:

| Component | Parts by Weight | |
|---|---|---|
| | Employed | Preferred Range |
| Commercial Butyl Rubber (corresponding to a GR-I-25 rubber) | 100 | 50-200 |
| Carbon Black (M.P.C.) | 66.0 | 20-100 |
| Zinc oxide | 5.0 | 3-50 |
| Sulfur | 2.0 | 0.5-20 |
| Stearic Acid | 0.5 | 0-5.0 |
| Tellurium Diethyl Dithiocarbamate | 1.25 | 0.3-10.0 |
| Hydrocarbon Plasticizer Oil [1] | 12.5 | 0-75 |

[1] The hydrocarbon plasticizer oil employed was an aromatic petroleum hydrocarbon oil derived from a naphthenic crude having the following characteristics:

| | Employed | Preferred Range |
|---|---|---|
| Specific Gravity | 0.96 | 0.90-0.99 |
| Flash Pt. (° F., open cup method) | 520 | 450-600 |
| Aniline Point, ° F. | 177 | 150-200 |
| SSU at 100° F. | 11,626 | 5,000-15,000 |
| SSU at 210° F. | 252 | 100-500 |
| $I_2$ No. (cg./g.) | 49 | 25-75 |

The results were as shown below:

*Table II*

ADHESION OF BUTYL TO COMMERCIAL GR-S CARCASS COMPOUND

| Test No. | Cement on Butyl (Brominated Butyl, percent) | Cement on GR-S | | Pounds Pull per inch |
|---|---|---|---|---|
| | | (Brominated Butyl, percent) | Natural Rubber, percent) | |
| A | 100 | 100 | | 18 |
| B | 100 | 75 | 25 | 30 |
| C | 100 | 50 | 50 | 36 |
| D | 100 | 25 | 75 | 23 |
| E | 100 | | 100 | 15 |

The above data show that excellent adhesions of 23 to 30 pounds pull per inch are obtained according to the invention (test Nos. B to D) when varying the range of brominated butyl to natural rubber ratio from 25 to 75% in the cement applied to the GR-S carcass compound.

One particular advantageous use for the brominated butyl rubber cement combinations of the present invention is in pneumatic tires of either the inner tube containing variety or in a tubeless type tire. Referring now to the drawing, the single FIGURE depicts a pneumatic tubeless tire mounted on wheel rim 12 which comprises a hollow toroidal type member which is substantially U-shaped in cross-section by virtue of an open portion which extends around the inner periphery of the member. In other words, the tire is in the form of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs to aid in adhesion to rim 12 when the tire is inflated.

The outer layer of the tire includes tread area 13 and sidewalls 14. The open portion of the horseshoe-shaped tire faces that portion of the inner circumference of the tire which is adjacent the said tread area 13 of the tire. The remaining construction of the tire may vary according to conventional fabrication, but in general the tire is a multi-layered type of structure with an outer layer as abovementioned. The layer next adjacent the outer layer generally comprises a carcass 15 which includes a rubber having incorporated therein a fabric composed of a plurality of cotton, rayon, or nylon cords.

The tire also includes an inner lining 16 advantageously made from rubber, e.g. butyl rubber or halogenated butyl rubber, which must be substantially impermeable to air. The lining 16 may also advantageously comprise a rubbery copolymer, halogenated copolymer or mixtures of the above wherein the copolymer comprises the reaction product of about 70 to 99.5 weight percent of a $C_4$—$C_7$ isoolefin, such as isobutylene, and about 0.5-30 weight percent of a $C_4$—$C_{14}$ multiolefin, such as isoprene which has been at least partially vulcanized by heating in the presence of a vulcanization agent for several minutes to 5 hours at 200°–400° F. The above multi-layers, at least three in number, are conventionally bonded or otherwise adhered together, for example, by cementing and/or especially by vulcanization, etc., to form a tire of a unitary structure.

If the carcass 15 is of GR-S rubber or GR-S and natural rubber, the brominated butyl rubber cement combinations of the present invention are advantageously employed between said carcass 15 and inner lining 16 if said lining is of butyl rubber. The brominated butyl rubber cement combinations of the present invention are also advantageously interposed between carcass 15 and the outer layer comprising tread area 13 and sidewalls 14 if said outer layer is of butyl rubber, e.g. high molecular weight-oil extended butyl rubber. In either or both instances, i.e., where the butyl rubber is employed as an air-holding inner lining or as an abrasion resistant, tread and sidewall area; the resulting tires are of increased commercial value.

Resort may be had to various modifications and variations without departing from the spirit of the invention or the scope of the appended claims.

What is claimed is:

1. A laminated article of manufacture which comprises a lamina containing a low unsaturated copolymer of a major proportion of a $C_4$ to $C_8$ isoolefin with a minor proportion of a $C_4$ to $C_{10}$ multiolefin of 0.5–15.0% combined multiolefin, a second lamina comprising a highly unsaturated rubber, and two interposed cement layers, the first layer being adjacent the low unsaturation copolymer lamina and comprising a vulcanizable brominated isoolefin-multiolefin rubbery copolymer of 0.5–15.0% combined multiolefin, said first layer being free of other vulcanizable rubbery materials, the second layer being adjacent the highly unsaturated rubber lamina and comprising about 40 to 60 weight percent of said brominated copolymer with about 60 to 40 weight percent of a more highly unsaturated vulcanizable rubber, said laminated article having an adhesion test value of at least 20 lbs. pull per inch at 77° F.

2. Article of manufacture according to claim 1 in which the second lamina comprises natural rubber.

3. Article of manufacture according to claim 1 in which the second lamina comprises a rubbery copolymer of butadiene with styrene.

4. Article of manufacture according to claim 1 in which the highly unsaturated rubber in the second cement is natural rubber.

5. Article of manufacture according to claim 1 in which the brominated isoolefin-multiolefin butyl rubbery copolymer contains at least about 0.5 weight percent of combined bromine but not more than about 3 atoms of combined bromine per molecule of combined multiolefin.

6. In a process for manufacturing a tubeless tire including a carcass member containing a composition comprising a rubbery copolymer of butadiene and styrene, the combination which comprises at least partially vulcanizing to said carcass member a layer disposed interiorly thereof, which layer comprises a rubbery copolymer of about 85.0–99.5% of an isoolefin and about 0.5–15.0% of a multiolefin reactive therewith, and vulcanizing to said carcass member a layer disposed exteriorly thereof comprising a rubbery copolymer containing about 85 to 99.5 weight percent of a $C_4$–$C_8$ isoolefin and a minor proportion of a $C_4$–$C_{10}$ multiolefin, said rubbery copolymer containing layer having been adhesively united to the carcass by pre-coating the rubbery copolymer with a cement containing a vulcanizable brominated isoolefin-multiolefin rubber copolymer of 0.5–15.0% combined multiolefin, said cement being free of other vulcanizable rubbery materials, pre-coating the carcass with a cement containing an admixture of 40 to 60% of said brominated isoolefin-multiolefin copolymer and 60 to 40% of natural rubber, and curing the resulting structure formed, whereby a laminated tire assembly is obtained having an adhesion test value of at least 20 lbs. pull per inch at 77° F.

7. Process according to claim 6 in which the brominated isoolefin-multiolefin copolymer contains at least about 0.5 weight percent of combined bromine but not more than about 3 atoms of combined bromine per molecule of combined multiolefin therein.

8. A process for preparing a laminar elastic structure which comprises coating a first lamina containing an isoolefin-multiolefin rubbery copolymer of 0.5–15.0% combined multiolefin with a first cement comprising a solution of a vulcanizable brominated isoolefin-multiolefin rubbery copolymer of 0.5–15.0% combined multiolefin, said first cement being free of other vulcanizable rubbery materials, coating a second lamina containing a high unsaturated rubber with a second cement comprising a solution of about 40 to 60% of said brominated isoolefin-multiolefin rubbery copolymer and about 60 to 40% of natural rubber, at least partially drying said cements, placing said laminae in adjacent relationship with their respective cement coatings touching one another, and curing the resulting structure formed, whereby a laminated structure is obtained having an adhesion test value of at least 20 lbs. pull per inch at 77° F.

9. A laminated article of manufacture which comprises a lamina of a low unsaturated rubbery copolymer of 95.0–0.99.5% of isobutylene with 0.5–5.0% of isoprene, a second lamina of a highly unsaturated rubber selected from the group of natural rubber and a rubbery butadiene-styrene copolymer, and two interposed cement layers, the first layer being adjacent the low unsaturation copolymer lamina and comprising as its sole vulcanizable constituent a vulcanizable brominated rubbery copolymer of 95.0–99.5% of isobutylene with 0.5–5.0% of isoprene, containing at least 0.5% of bromine but not more than about 3 atoms of combined bromine per molecule of combined isoprene, the second layer being adjacent the highly unsaturated rubber lamina and comprising about 40–60% of said brominated copolymer admixed with about 60–40% of natural rubber, said two laminae and two interposed cement layers being all vulcanized together as a laminated article having an adhesion test value of at least 20 lbs. pull per inch at 77° F.

10. Article according to claim 9 having an adhesion test value of at least about 36 lbs. pull per inch at 77° F., in which the second cement layer adjacent the highly unsaturated rubber lamina comprises about 50% of said brominated copolymer with 50% of natural rubber.

11. In a rubber tire, a combination which comprises a carcass member containing a plurality of cords imbedded in a highly unsaturated rubber, and at least one layer of a low unsaturation isoolefin-multiolefin rubbery copolymer of 0.5 to 15% combined multiolefin adhesively united thereto by means of two interposed cements, the first cement being adjacent to the isoolefin-multiolefin rubber and comprising as sole vulcanizable rubbery material, a vulcanizable brominated isoolefin-multiolefin rubber copolymer of 0.5 to 15% combined multiolefin, the second cement being adjacent to the highly unsaturated rubber and comprising an admixture of 40 to 60% of said brominated isoolefin-multiolefin copolymer and 60 to 40% of natural rubber, said laminated tire assembly having, when vulcanized, an adhesion test value of at least 20 pounds pull per inch at 77° F.

References Cited in the file of this patent

UNITED STATES PATENTS

| | | |
|---|---|---|
| 2,467,322 | Lightbown et al. | Apr. 12, 1949 |
| 2,575,249 | Connell et al. | Nov. 13, 1951 |
| 2,698,041 | Morrissey et al. | Dec. 28, 1954 |
| 2,698,042 | Perkins | Dec. 28, 1954 |
| 2,720,479 | Crawford et al. | Oct. 11, 1955 |
| 2,732,354 | Morrissey et al. | Jan. 24, 1956 |
| 2,775,537 | Wilson et al. | Dec. 25, 1956 |
| 2,822,311 | Rowe et al. | Feb. 4, 1958 |
| 2,825,675 | Wilson et al. | Mar. 4, 1958 |